United States Patent
Tatemura et al.

(10) Patent No.: US 9,454,033 B2
(45) Date of Patent: Sep. 27, 2016

(54) LIQUID CRYSTAL DISPLAY DEVICE

(71) Applicant: JAPAN DISPLAY INC., Tokyo (JP)

(72) Inventors: Makoto Tatemura, Yokohama (JP); Yuichi Nakamura, Oamishirasato (JP); Masaharu Itakura, Shirako-machi (JP); Yoshitomo Ogishima, Mobara (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/863,095

(22) Filed: Sep. 23, 2015

(65) Prior Publication Data

US 2016/0202547 A1 Jul. 14, 2016

Related U.S. Application Data

(63) Continuation of application No. 13/845,437, filed on Mar. 18, 2013, now Pat. No. 9,195,091.

(30) Foreign Application Priority Data

Apr. 13, 2012 (JP) ................. 2012-091466

(51) Int. Cl.
G02F 1/1333 (2006.01)
G02F 1/1335 (2006.01)
G02F 1/1368 (2006.01)
G02F 1/1362 (2006.01)
G02F 1/1339 (2006.01)

(52) U.S. Cl.
CPC ....... *G02F 1/133514* (2013.01); *G02F 1/1339* (2013.01); *G02F 1/1368* (2013.01); *G02F 1/136209* (2013.01); *G02F 2001/133388* (2013.01)

(58) Field of Classification Search
CPC .......... G02F 1/1333; G02F 1/133305; G02F 1/136209; G02F 1/13351; G02F 1/133512; G02F 1/133514; G02F 1/1368; G02F 1/1339; G02F 2001/133388
USPC ........................................ 349/158
See application file for complete search history.

(56) References Cited

U.S. PATENT DOCUMENTS

| | | | |
|---|---|---|---|
| 5,850,275 A * | 12/1998 | Watanabe | G02F 1/1345 349/110 |
| 6,400,428 B1 | 6/2002 | Izumi | |
| 6,806,936 B2 | 10/2004 | Nakaminami et al. | |
| 7,646,466 B2 | 1/2010 | Hashimoto | |
| 8,120,743 B2 | 2/2012 | Katsumura et al. | |
| 8,384,840 B2 | 2/2013 | Mishima | |
| 8,395,746 B2 * | 3/2013 | Hosoya | 349/149 |
| 2009/0002607 A1 | 1/2009 | Kubota et al. | |
| 2009/0303427 A1 | 12/2009 | Kondo et al. | |

FOREIGN PATENT DOCUMENTS

JP 2008-266046 A 11/2008
JP 2011-84453 A 4/2011

* cited by examiner

*Primary Examiner* — Nathanael R Briggs
*Assistant Examiner* — William Peterson
(74) *Attorney, Agent, or Firm* — Typha IP LLC

(57) ABSTRACT

A liquid crystal display device sandwiching liquid crystal between a TFT substrate having a rectangular plane and an opposing substrate having a rectangular plane, wherein a long side of the TFT substrate is longer than a long side of the opposing substrate, the long side of the opposing substrate is formed with a chamfer, and a light shielding film made of metal is formed on the TFT substrate around a position corresponding to the center of the long side of the opposing substrate. By using the light shielding film, the chipping condition of the opposing substrate near the chamfer can be accurately and rapidly evaluated.

3 Claims, 10 Drawing Sheets

A-A

B-B

C-C

LIQUID CRYSTAL DISPLAY DEVICE

CROSS-REFERENCE TO RELATED APPLICATION

This application is a continuation of U.S. patent application Ser. No. 13/845,437, fled on Oct. 17, 2013, which claims priority from Japanese application JP 2012-091466 filed on Apr. 13, 2012, the contents of which are hereby incorporated by reference into this application.

FIELD OF THE INVENTION

The present invention relates to a display device, and specifically to a liquid crystal display device with an improved bending strength of a liquid crystal display panel.

BACKGROUND OF THE INVENTION

A liquid crystal display device is provided with a TFT substrate including a pixel electrode and a thin film transistor (TFT) in a matrix form and an opposing substrate opposing the TFT substrate and formed thereon with a color filter or the like in a position corresponding to the pixel electrode of the TFT substrate, and liquid crystal is sandwiched between the TFT substrate and the opposing substrate. The device forms an image by controlling a light transmission of a liquid crystal molecule with respect to each pixel.

For such a liquid crystal display device, there is a demand for reducing an external size of the set while retaining a certain size of a screen as well as for reducing a thickness of the liquid crystal display panel. However, reduction in the thickness of the liquid crystal display panel may lead to a problem of its bending strength. Especially, a system of controlling a display on a screen by pressing a finger or the like on a touch panel has been increasingly used in recent years. In such a system, the bending stress is applied to the liquid crystal display panel through the touch panel.

When the bending stress is applied to the liquid crystal display panel, if there is a chip of glass or the like at an edge of the TFT substrate or the opposing substrate which are glass substrates, the glass may break from that point. In order to prevent this, the edge of the glass substrate is chamfered off. However, chamfering off alone cannot necessarily provide a glass substrate with reliably high bending strength.

Japanese Unexamined Patent Application Publication No. 2011-84453 describes a configuration of a chamfered glass substrate with an inclination root mean square of a roughness curve of the chamfered surface RΔq being 0.1 or less to prevent a crack of the glass when a flexure is caused in the glass substrate. Japanese Unexamined Patent Application Publication No. 2008-266046 describes a configuration of a glass substrate having its edge chamfered off with the chamfering size being 18 to 75 μm in a direction of the substrate thickness to make it difficult for a crack to be caused in the glass substrate.

SUMMARY OF THE INVENTION

Chamfering the glass substrate such as the TFT substrate and the opposing substrate constituting the liquid crystal display panel may improve the bending strength, but hardly ensures a consistent strength. In order to ensure the bending strength in the total number of the liquid crystal display panels, the edge of the glass substrate needs to be evaluated with the total number of the liquid crystal display panels in a production line.

Although it is performed on and near the chamfered edge of the glass substrate using an optical system such as a camera, the measurement accuracy has not been enough and the finished liquid crystal display panels have varied in bending strength.

It is an object of the present invention to achieve a liquid crystal display device that enables an efficient and accurate evaluation of the bending strength in the production line. It is another object of the present invention to achieve a liquid crystal display device having consistent bending strength characteristics.

The present invention seeks to overcome the above problems, and some of its specific means are described below.

(1) A liquid crystal display device sandwiching liquid crystal between a TFT substrate having a rectangular plane with a TFT and a pixel electrode formed thereon in a matrix form and an opposing substrate having a rectangular plane with a color filter formed thereon, wherein a long side of the TFT substrate is longer than a long side of the opposing substrate, the long side of the opposing substrate is chamfered, and the TFT substrate has a light shielding film made of metal formed thereon around a position corresponding to the center of the long side of the opposing substrate.

(2) A liquid crystal display device sandwiching liquid crystal between a TFT substrate having a rectangular plane with a TFT and a pixel electrode formed thereon in a matrix form and an opposing substrate having a rectangular plane with a color filter formed thereon, wherein a long side of the TFT is longer than a long side of the opposing substrate, the long side of the opposing substrate is chamfered, a black matrix is formed in a position corresponding to the center of the long side of the opposing substrate, there is no chip on a top surface of the opposing substrate where a chamfer is formed in a predetermined region on both sides of the center of the long side, and the predetermined region has a length of 1.3 mm along the long side of the opposing substrate and a length of 0.1 mm along a short side direction of the opposing substrate.

According to the present invention, it is possible to efficiently and accurately evaluate a condition, such as a chip, of a glass substrate constituting a liquid crystal display panel. Furthermore, because the total number of the liquid crystal display panels can be evaluated in a short time, it is possible to perform the evaluation of the bending strength on the total number of liquid crystal display panels and also to provide the market with the liquid crystal display panels having a reliably high quality.

BRIEF DESCRIPTION OF THE DRAWINGS

FIGS. 5A and 5B show an example of a chip caused by cutting the glass before chamfering or the like;

DETAILED DESCRIPTION OF THE PREFERRED EMBODIMENTS

Details of the present invention will be described below with reference to embodiments.

First Embodiment

Figure 1:
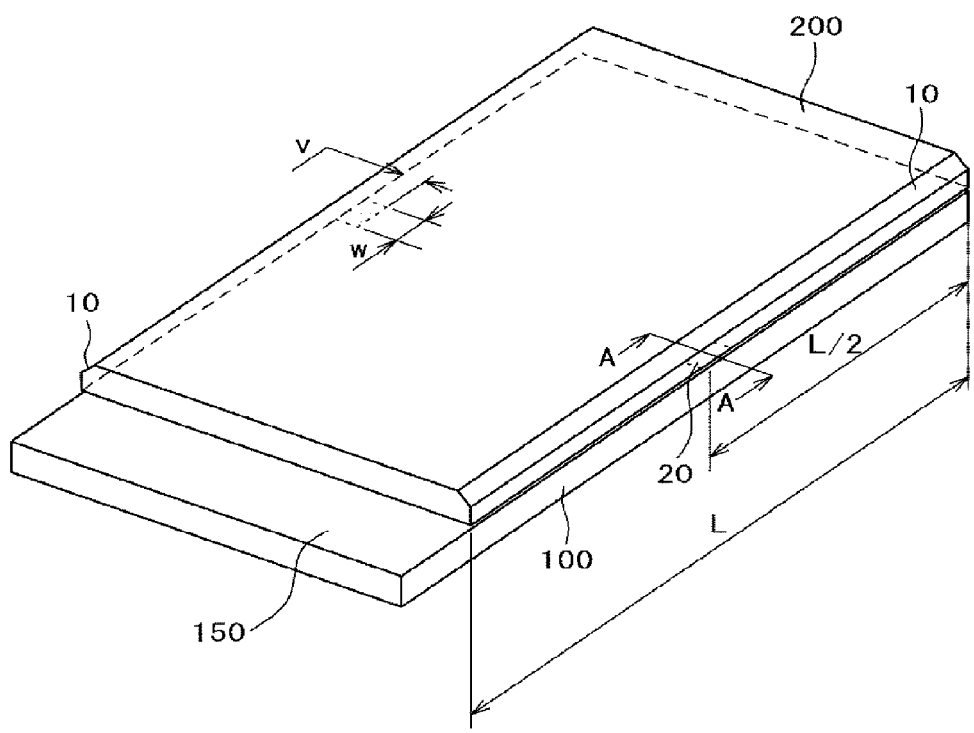
FIG. 1 is a perspective view of a liquid crystal display device according to the present invention.

FIG. 1 is a perspective view of a liquid crystal display device according to the present invention. Both terms "liquid crystal display panel" and "liquid crystal display device" may be used herein, which are interchangeable. Such a liquid crystal display panel can be used, for example, in a mobile phone and the like. In FIG. 1, an opposing substrate 200 formed with a color filter corresponding to each pixel is arranged in an opposing manner on a TFT substrate 100 on which pixels having a TFT and a pixel electrode are arranged in a matrix form. The TFT substrate 100 and the opposing substrate 200 are bonded together by a peripheral sealing material, and liquid crystal is sandwiched by the TFT substrate 100 and the opposing substrate 200. The TFT substrate 100 is formed to be larger than the opposing substrate 200, and a portion consisting of the TFT substrate 100 alone is made to be a terminal portion 150.

In FIG. 1, two long sides of the opposing substrate 200 are chamfered. As will be explained later, because the chamfered portion has a significant influence on the bending strength, it is required to evaluate a shape of the chamfer 10 in a production step. In order to perform the evaluation with high accuracy and at a high speed, according to the present invention, as shown in FIG. 1, an island of a light shielding film 20 is formed on the portion corresponding to the center of the long side of the opposing substrate 200. In FIG. 1, assuming the length of the long side of the opposing substrate 200 as L, the center of the island of the light shielding film 20 corresponds to the position of L/2.

The island of the light shielding film 20 can be highly accurately measured when the chamfer 10 is measured using a camera or the like during the step. The light shielding film 20 is formed on the TFT substrate 100, its position is at the center of the long side of the opposing substrate 200, and its size is defined by, for example, the width w along the long side of the opposing substrate 200 being 1.3 to 2.6 mm and the depth v, that is the length in the direction of the short side of the opposing substrate 200, being 0.1 to 0.2 mm. The light shielding film 20 is arranged at the center of the long side of the opposing substrate 200 because the center receives the highest stress when the opposing substrate 200 is pressed.

The light shielding film 20 formed on the TFT substrate 100 is formed of a metal film, because various metal films are formed on the TFT substrate 100 for use as a wire and an electrode, the light shielding film 20 can be formed at the same time when one or more of the layers are patterned.

Figure 2:
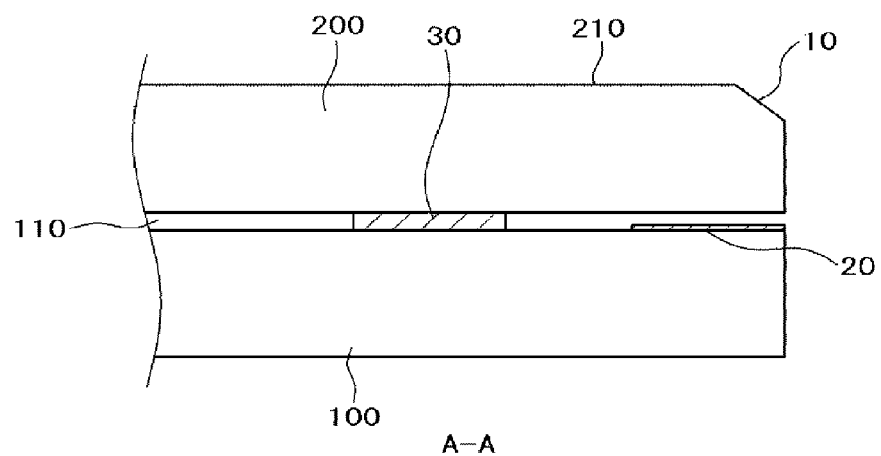
FIG. 2 is an A-A cross-sectional view of FIG. 1.

FIG. 2 is an A-A cross-sectional view of FIG. 1. In FIG. 2, the TFT substrate 100 and the opposing substrate 200 are bonded together by the sealing material 30. A liquid crystal 110 is sealed inside the sealing material 30. There is a space outside of the sealing material 30, and the island of the light shielding film 20 is formed on the TFT substrate 100 side of this portion.

Figure 3:
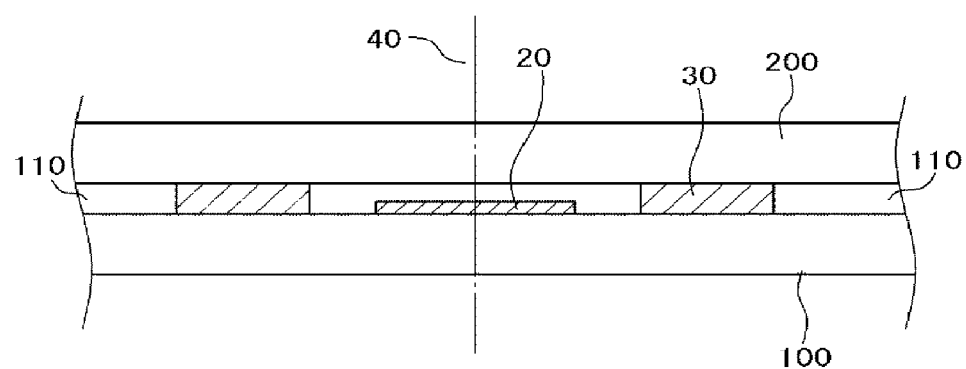
FIG. 3 is a cross-sectional view showing a boundary portion of adjacent liquid crystal display panels on a mother substrate.

Although FIG. 1 shows an individual liquid crystal display panel, because it is not efficient to individually create separate liquid crystal display panels, a mother panel arranged thereon with a large number of liquid crystal display panels is manufactured and then it is separated into respective liquid crystal display panels by dicing, scribing, or the like. FIG. 3 shows a boundary portion between individual liquid crystal display panels on such a mother panel. The island of the light shielding film 20 is formed on the boundary portion between the liquid crystal display panels including a separation line 40.

Figure 4:
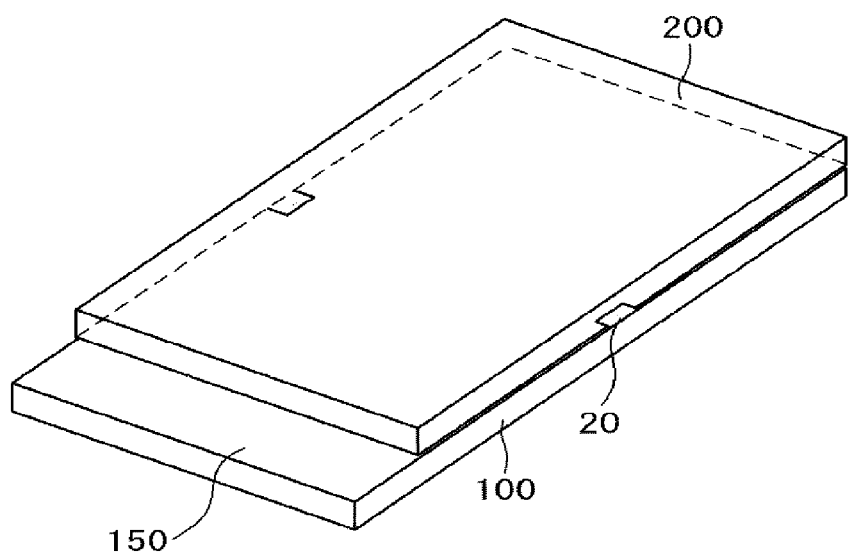
FIG. 4 is a perspective view of the liquid crystal display device before chamfering and with a light shielding film formed thereon.

FIG. 4 is a perspective view of the individual liquid crystal display panel separated from the mother substrate. The TFT substrate 100 and the opposing substrate 200 are not yet chamfered in FIG. 4. A chip of glass in the TFT substrate 100 or the opposing substrate 200 can occur during scribing for separating each liquid crystal display panel and during chamfering.

Figure 5A:
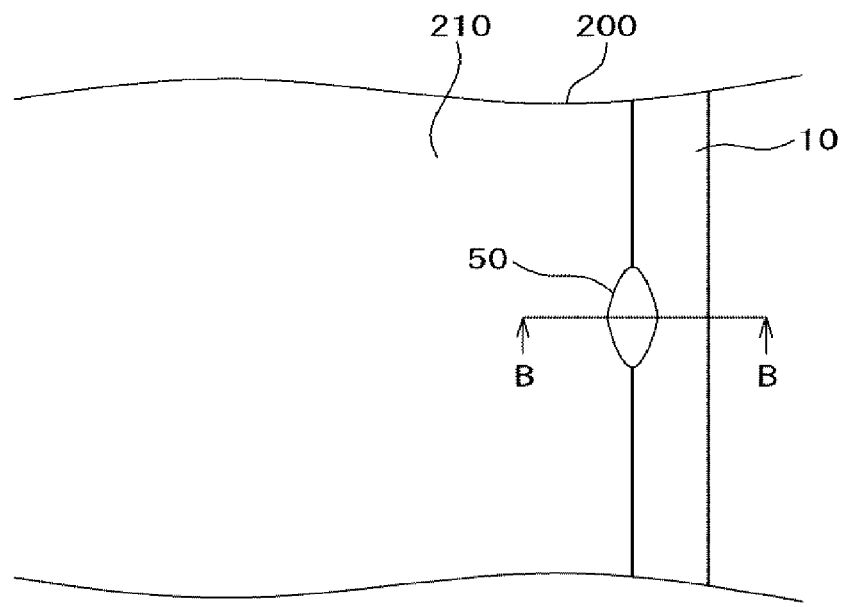
Figure 5B:
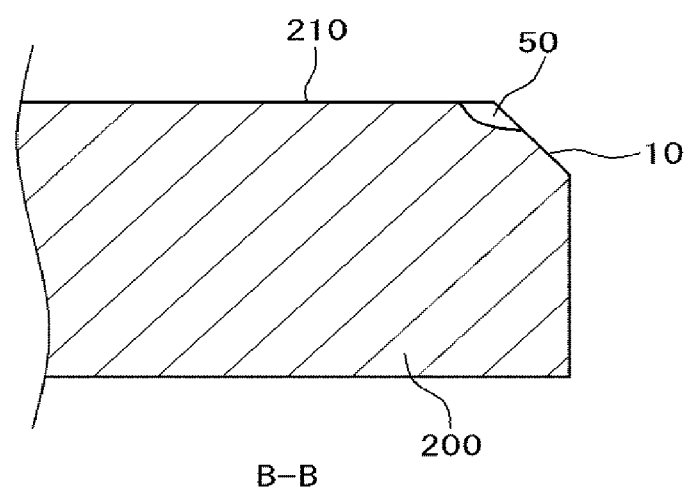
Figure 6A:
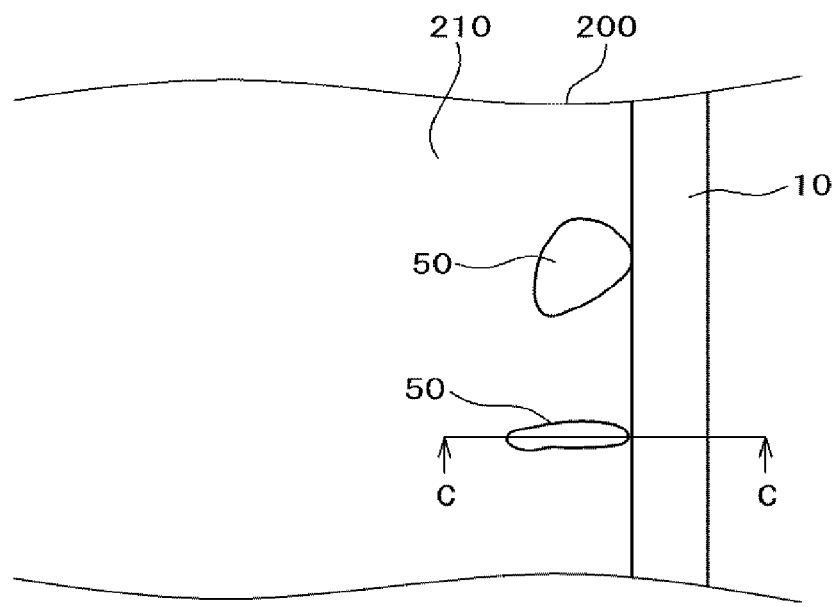
FIGS. 6A and 6B show an example of a chip caused when forming a chamfer.
Figure 6B:
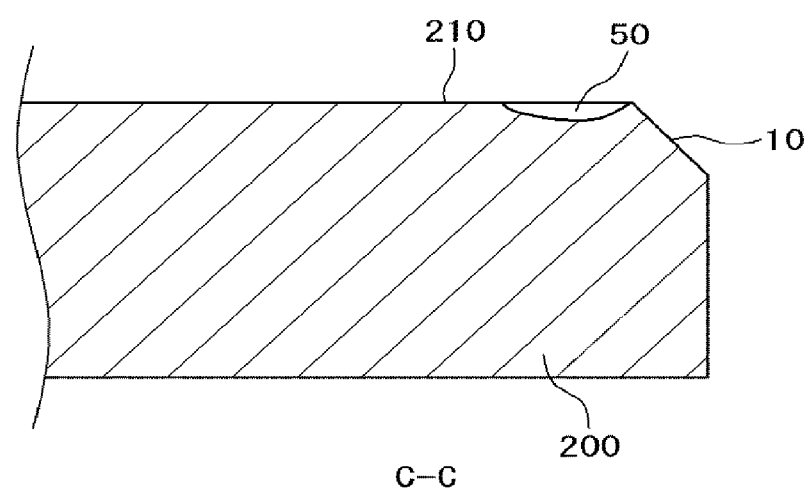

FIGS. 5A and 5B show a chip 50 caused during scribing or the like, wherein FIG. 5A is a top view of the chip portion and FIG. 5B is a B-B cross-sectional view of FIG. 5A. The chip 50 in FIGS. 5A and 5B is characterized by being present both in the chamfer 10 of the opposing substrate 200 and on the top surface 210 of the opposing substrate. FIGS. 6A and 6B show the chip 50 caused during chamfering, wherein FIG. 6A is a top view of the chip portion and FIG. 6B is a C-C cross-sectional view of FIG. 6A. The chip 50 in FIGS. 6A and 6B is characterized by being present only on the top surface of the opposing substrate 200.

An influence on the bending strength of the opposing substrate 200 is largely affected by the chip 50 caused during chamfering, i.e. the chip 50 present on the top surface of the opposing substrate 200. Therefore, it is necessary to incorporate a step of inspecting the shape of the chamfered portion into the manufacturing step.

Figure 7:
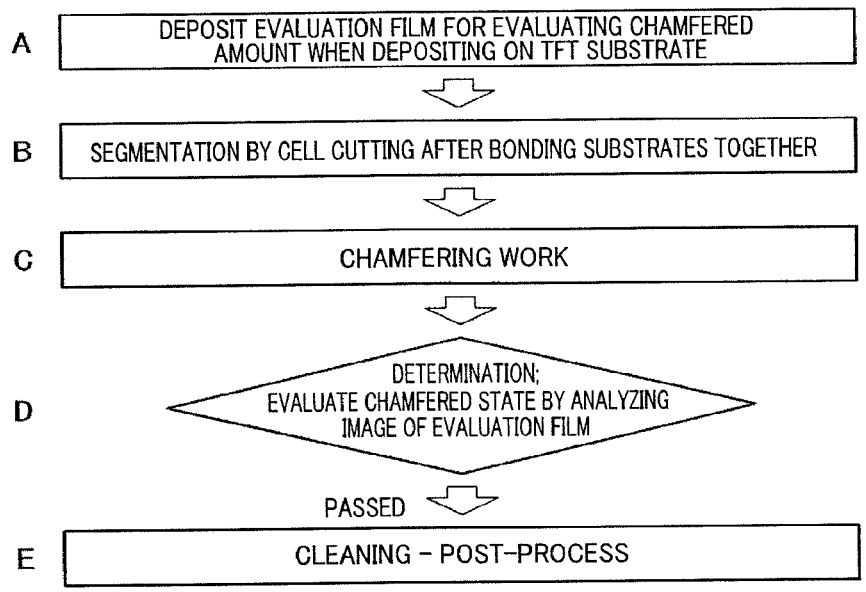
FIG. 7 is a process flow showing steps before and after chamfering the liquid crystal display device.

FIG. 7 is a process flow of manufacturing the liquid crystal display panel according to the present invention. In FIG. 7, at Step A, during a film formation on the TFT substrate 100, the island of the light shielding film 20 is formed on the TFT substrate 100 for facilitating an evaluation of the chamfer 10. This is performed when a mother TFT substrate is formed. Subsequently the mother TFT substrate and a mother opposing substrate are bonded together to form the mother substrate. Then at Step B, the mother substrate is separated into the individual liquid crystal display panels by cell cutting. At Step C, the chamfering work is then performed on each liquid crystal display panel.

After that, at Step D of determination, the chamfering work is evaluated on all of the individual liquid crystal display panels. This step is performed by, for example, evaluating an image of the top surface of the opposing substrate 200 corresponding to the portion with the chamfer 10 using an inspection camera or the like. During this chamfer evaluation, an acceptable product is directed to Step E for cleaning and then directed to a post-process. During the determination configuration D, a rejected product is either chamfered again or discarded if it is determined to be beyond restoration.

Figure 8:
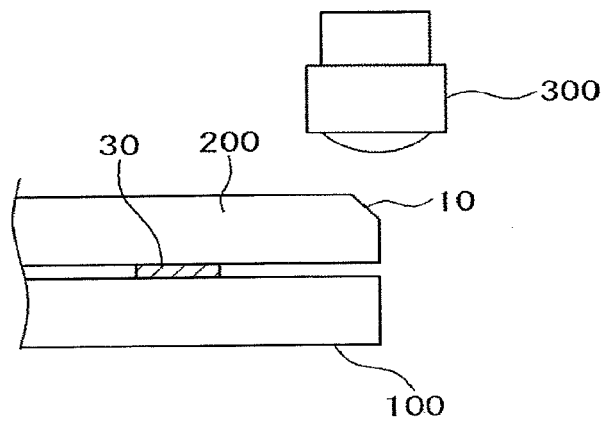
FIG. 8 is a schematic view showing a method of evaluating an area around the chamfer according to the prior art.

FIG. 8 is a schematic view showing an outline of the inspection at Step D in FIG. 7 according to the prior art. In FIG. 8, the inspection camera 300 is installed above the chamfer 10 of the opposing substrate 200 of the liquid crystal display panel, and this camera 300 is used to perform the inspection of whether there is the chip 50 on the top surface 210 of the opposing substrate 200 in the area around the chamfer 10.

In the prior art example shown in FIG. 8, there is no specific pattern formed on a bottom surface of the opposing substrate 200 or the top surface of the TFT substrate 100; an irregular pattern ca be formed thereon or an object can be reflected thereon. Thus, it is not possible to achieve sufficient accuracy when measuring the top surface 210 of the opposing substrate 200 using the camera 300.

Figure 9:
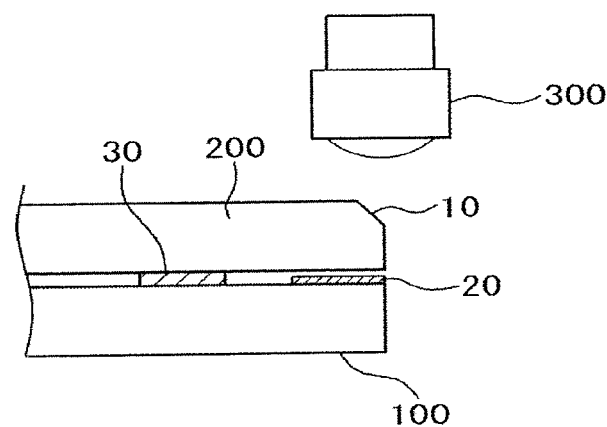
FIG. 9 is a schematic view showing a method of evaluating the area around the chamfer according to the present invention.

FIG. 9 is a schematic view showing an outline of the inspection at Step D in FIG. 7 according to the present invention. In FIG. 9, the opposing substrate 200 is formed with the chamfer 10, and the island of the shielding pattern 20 is formed on the top surface of the TFT substrate 100. The size of the shielding pattern 20 is defined by, as explained with reference to FIG. 1, the width w in the side direction being 1.3 to 2.6 mm and the depth v being 0.1 to 0.2 mm at the center of the long side.

The present invention is characterized in that no chip of glass is present on the top surface 210 of the opposing substrate 200, as shown in FIG. 6, in the region where the shielding pattern 20 is present. According to the present invention, with the presence of the shielding pattern 20, the presence of the chip 50 on the top surface of the opposing substrate 200 around the chamfer 10 can be measured accurately and rapidly.

The chip 50 on the top surface 210 of the opposing substrate 200 is measured because the bending strength on the opposing substrate 200 is most affected by the chip 50 present on the top surface 210 of the opposing substrate 200. The strictest specification is that there is no chip of glass in the island of the light shielding film, which is the inspection area, sized to 2.6 mm in the long side direction and 0.2 mm in the short side direction, namely the depth. The loosest specification of the size of the island of the light shielding film 20, which is the inspection area, is characterized in that there is no chip 50 of glass in a range of 1.3 mm in the long side direction and 0.1 mm in the short side direction, namely the depth.

Thus, at the center of the opposing substrate 200, by the fact that there is no chip of glass on the top surface 210 after chamfering, the bending strength of the opposing substrate 200 can be kept equal to or higher than a predetermined value, and at the same time, the presence of the chip 50 on the top surface 210 after chamfering the opposing substrate 200 can be controlled.

Figure 10:
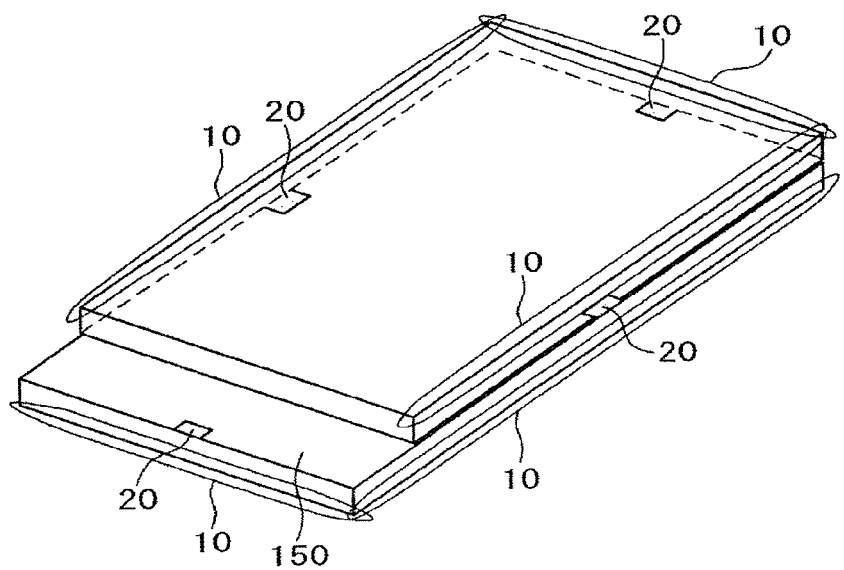
FIG. 10 is a perspective view of the liquid crystal display device showing another side which can be chamfered.

FIG. 1 shows the case of forming the chamfer 10 on the long side of the opposing substrate 200. The chamfer 10 can be effectively formed not only on the long side but also other sides of the opposing substrate 200 or even on the sides of the TFT substrate 100. FIG. 10 shows the sides which can be formed with the chamfer 10 and also be effective with the chamfer 10. FIG. 10 shows the case of forming the chamfer 10 on four sides of the TFT substrate 100 and three sides of the opposing substrate 200. The chamfer 10 is formed on seven sides in total.

In FIG. 10, the short side of the opposing substrate 200 facing a terminal portion 150 and the top surface of the TFT substrate 100 facing the terminal 150 are not chamfered. This is because a sufficient angle cannot be spared for the chamfer due to the small thickness of the opposing substrate 200 of the liquid crystal display panel shown in FIG. 10.

In FIG. 10, below the sides to be formed with the chamfer 10, the island of the light shielding film 20 is formed during formation of the chamfer 10 so that the chip on the top surface of the opposing substrate 200 and that on the bottom surface of the TFT substrate 100 can be observed well. For example, in order to efficiently evaluate the chamfer 10 on the short side of the opposing substrate 200, the island of the light shielding film 20 is formed in a corresponding portion of the TFT substrate 100. This enables an accurate and rapid evaluation of the chamfered portion as shown in FIG. 9.

Such an island of the light shielding film 20 can be shared by the chamfer evaluation of the opposing substrate 200 and the chamfer evaluation of the TFT substrate 100. The sharing is possible only by changing focal points of the camera 300. Although FIG. 10 shows the light shielding film 20 in a case of forming the chamfer 10 on the bottom surface of the terminal portion 150 of the TFT substrate 100, it can be replaced by the terminal made of the metal film formed on the terminal portion 150.

Figure 11:
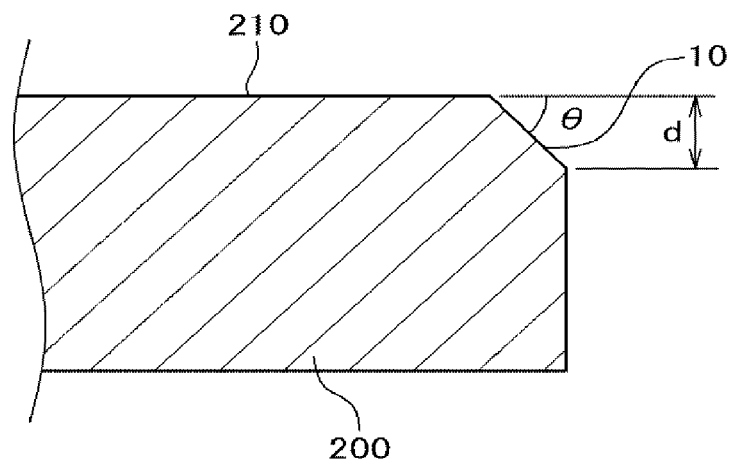
FIG. 11 is a cross-sectional view of a normal chamfer.

FIG. 11 is a cross-sectional view of the standard chamfer 10. In FIG. 11, an angle θ of the chamfer 10 is 45 degrees, and a width d of the chamfer 10 is 15 to 50 μm. Variation in the bending strength increases if the width d of the chamfer 10 is smaller than 15 μm, and the chip 50 is more likely to occur on the top surface 210 of the opposing substrate 200 if it exceeds 50 μm.

Figure 12:
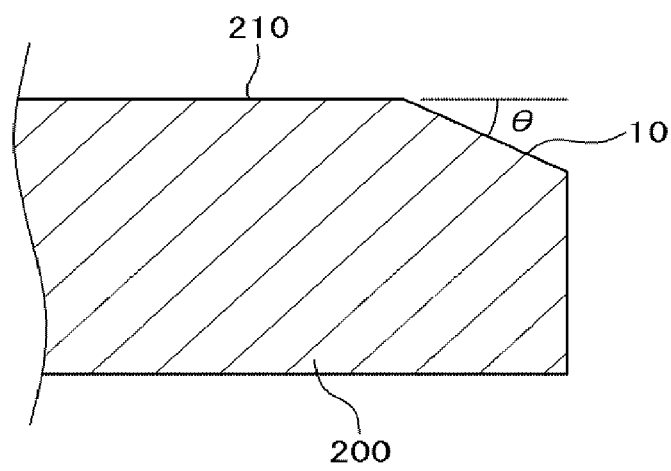
FIG. 12 is a cross-sectional view showing an example of a modified chamfer.

When the chamfer 10 is formed in this manner, if the chip 50 is caused on the top surface 210 of the opposing substrate 200 or the like, the product cannot be shipped due to its insufficient bending strength. FIG. 12 shows an example in which the chip 50 has been removed from the top surface 210 of the opposing substrate 200 by forming a further chamfer 10 including the chip portion. In FIG. 12, the angle θ of the chamfer 10 with respect to the top surface 210 is made smaller than 45 degrees.

Figure 13:
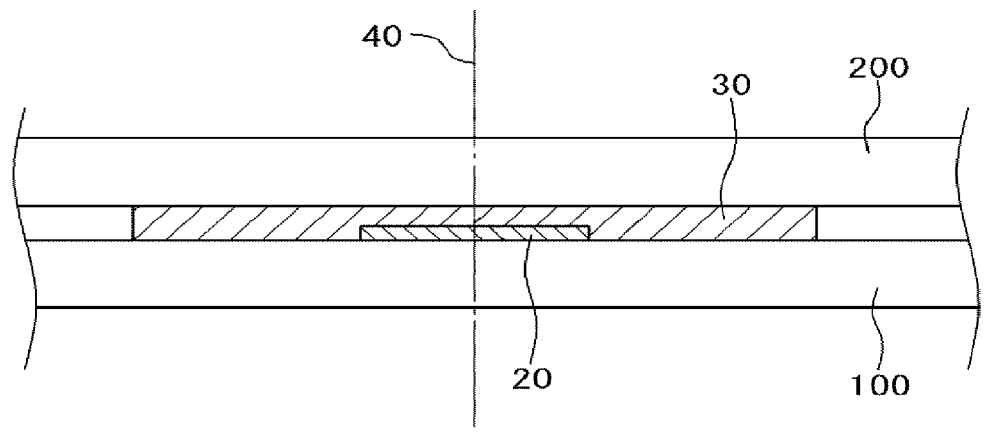
FIG. 13 is a cross-sectional view showing another example of the boundary portion between the adjacent liquid crystal panels on the mother substrate.

FIG. 13 shows the boundary portion between two adjacent liquid crystal display panels on the mother substrate. In the example shown in FIG. 13, the sealing material 30 is continuously formed between two adjacent liquid crystal display panels. In this case, as in FIG. 3, by forming the island of the light shielding film 20 with a predetermined width on both sides of the separation line 40, the evaluation of the chip 50 after forming the chamfer can be performed simply and rapidly.

Although the sealing material 30 is formed over the light shielding film 20 in FIG. 13, because the sealing material 30 is not perfectly black, the light shielding film 20 can be seen through the sealing material 30, and the chip 50 on the top surface 210 of the opposing substrate 200 and the like can be reliably and efficiently measured as shown in FIG. 9 by using the light shielding film 20.

Figure 14:
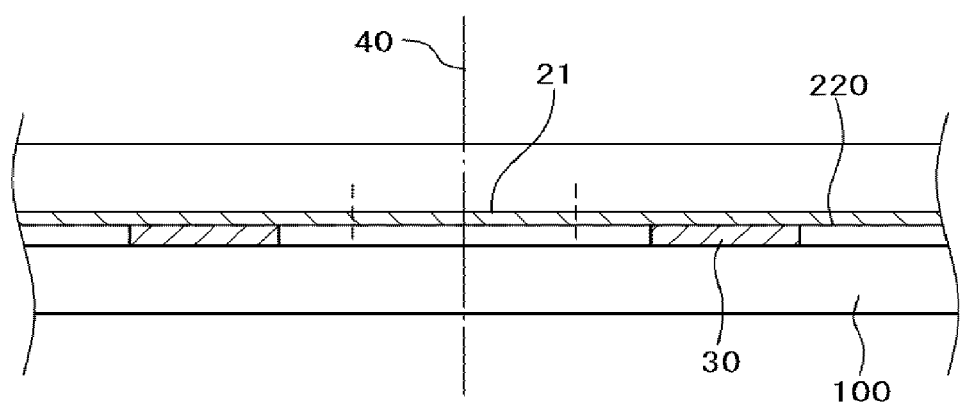
FIG. 14 is a cross-sectional view showing an example of a case in which a black matrix is used as a light shielding firm for chamfer evaluation.

FIG. 14 shows the boundary portion between the two adjacent liquid crystal display panels on the mother substrate. In the example shown in FIG. 14, a black matrix 220 formed on the opposing substrate 200 is formed to continue with the two adjacent liquid crystal display panels. The black matrix 220 has the same effect as the light shielding film 20, the chip on the top surface 210 of the opposing substrate 200 in the chamfered portion can be evaluated using the black matrix 220 without otherwise forming the island of the light shielding film 20.

In the case of FIG. 14, however, because the black matrix 220 is continuously formed, an evaluation range for the chip 50 needs to be determined in advance when the measurement is made by the camera 300 or the like as shown in FIG. 9. The evaluation range 21 is of the same size as the island of the light shielding film 20 in FIG. 1 and the like. That is, the strictest specification is that there is no chip 50 of glass in the range sized to 2.6 mm in the long side direction of the opposing substrate and 0.2 mm in the short side direction, namely the depth. The loosest specification is that there is no chip 50 of glass in a range of 1.3 mm in the long side direction of the opposing substrate and 0.1 mm in the short side direction, namely the depth.

Figure 15:
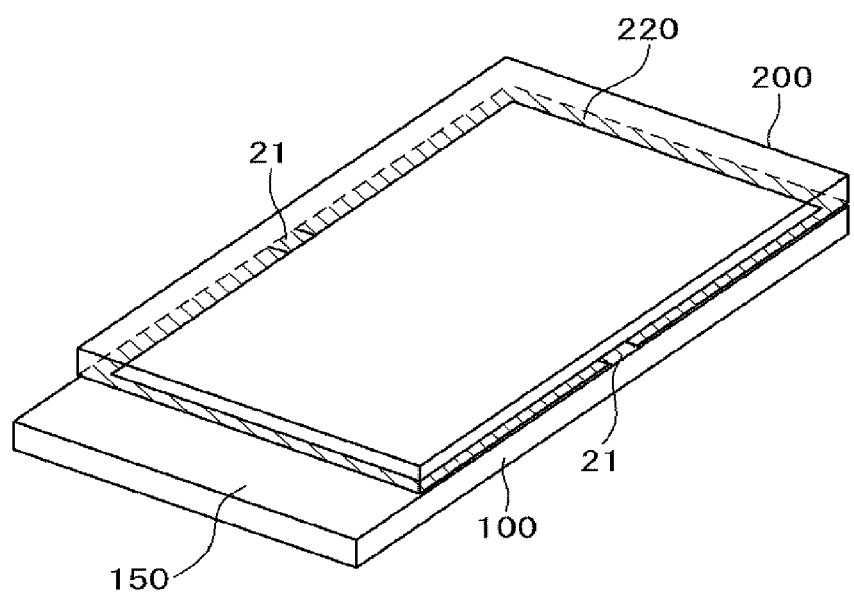
FIG. 15 is a perspective view showing an example of a case in which the black matrix is used as the light shielding film for the chamfer evaluation.

FIG. 15 is a perspective view showing the range of the black matrix 220 in the periphery of the liquid crystal display panel in a case of dividing the mother substrate by the separation line 40 shown in FIG. 14. With the measurement of the chip 50 using the camera 300 or the like shown in FIG. 9, the range 21 in FIG. 15 will be measured. Although the boundary is indicated by the islands of the range 21 in FIG. 15, such a boundary is not indicated on an actual product, and therefore it is necessary to set a measuring device to measure inside a predetermined area.

Although the range 21 of the light shielding film is indicated in FIG. 15 assuming a case of forming the chamfer 10 on the top surface 210 side of the opposing substrate 200 or on the bottom surface side of the TFT substrate 100, the configuration is not limited to this but the accurate and rapid evaluation of the chip 50 can also be performed only by setting the range inside the black matrix 220 when the chamfer 10 is formed on the short side of the opposing substrate 200 and/or TFT substrate 100.

The length of the long side to be inspected may be in the range of 0.3 to 10 mm depending on the thickness or a property of the glass, a cycle time, a customer's demand, or the like.

The invention claimed is:

1. A liquid crystal display device sandwiching liquid crystal between a first substrate having a rectangular plane with a TFT and a pixel electrode formed thereon in a matrix form and a second substrate having a rectangular plane with a color filter formed thereon,
    wherein a long side of the first substrate is longer than a long side of the second substrate,
    the long side of the first substrate or the second substrate is chamfered, and
    the first substrate has a light shielding region made of metal, the light shielding region is disposed in the place overlapping with the chamfered area of the first substrate or the second substrate, and
    a size of the light shielding region is between 1.3 mm and 2.6 mm along the long side of the first substrate or the second substrate and between 0.1 mm and 0.2 mm along a short side direction of the first substrate or the second substrate.

2. The liquid crystal display device according to claim 1, wherein there is no chip on a top surface of the chamfered area overlapping with the light shielding region.

3. The liquid crystal display device according to claim 1, wherein the light shielding region is covered by sealing material bonding the first substrate to the second substrate.

* * * * *